March 25, 1958  L. G. DYMECK  2,827,811
WIRE STRIPPING APPARATUS

Filed June 29, 1955  3 Sheets-Sheet 1

INVENTOR,
LEWIS G. DYMECK
BY
Henry Heyman
ATTORNEY

March 25, 1958 L. G. DYMECK 2,827,811
WIRE STRIPPING APPARATUS
Filed June 29, 1955 3 Sheets-Sheet 2

INVENTOR,
LEWIS G. DYMECK
BY
Henry Heyman
ATTORNEY

March 25, 1958

L. G. DYMECK 2,827,811

WIRE STRIPPING APPARATUS

Filed June 29, 1955

INVENTOR,
LEWIS G. DYMECK
BY
Henry Heyman
ATTORNEY

United States Patent Office 2,827,811
Patented Mar. 25, 1958

2,827,811

WIRE STRIPPING APPARATUS

Lewis G. Dymeck, Tucson, Ariz., assignor to Hughes Aircraft Company, Culver City, Calif., a corporation of Delaware Application June 29, 1955, Serial No. 518,727

6 Claims. (Cl. 81—9.51)

The present invention relates generally to an apparatus for stripping wire and relates more specifically to a strippping apparatus adapted for accurately removing portions of insulation from various types of wire.

In the manufacture of precision electrical and electronic equipment, it is usually necessary that wire leads be provided between various components and junction points in such equipment. Additionally, in order to insure efficient and reliable operation of this equipment, one factor for such operation resides in the precision removal of insulation from various wire leads and connectors. Heretofore, it has been the usual practice to employ either hand tools, knives or cutters of various types for removing insulation from wire, the practice being to ring the insulation with the sharp instruments and then to remove this insulation. This act frequently cuts various strands of the wire leads, thus reducing the effectiveness thereof, or created grooves circumferentially in the metal of such leads, whereby to cause a tendency for breakage thereof at a later time and under flexing or vibrating conditions. Such actual cutting or potential breakage of the lead material is obviously detrimental to the efficient operation of the electrical or electronic components in which these wires are utilized, it therefore being important to eliminate this damage, even though apparently very minor, to the wire material.

Accordingly, it is one important objective of the present invention to provide an apparatus for removing insulation from insulated wires in such a manner as to prevent any damage to the metallic portion of the wire or contact of cutting devices therewith.

It is another important object of the present invention to provide a wire stripping apparatus having novel means for aligning and supporting an insulated wire and cutting the insulation from a portion thereof.

A further important object of the present invention is to provide a novel wire stripping apparatus having novel means for supporting, actuating and driving a cutter with respect to an insulated wire.

Still another important object of the present invention is to provide a novel wire stripping apparatus that is efficient in use, comparatively simple in construction, effective in operation and which may be integrated with present mass production techniques.

Other and further important objects of the present invention will become apparent from the disclosures in the following detailed specification, appended claims and accompanying drawings, wherein:

Figure 1:
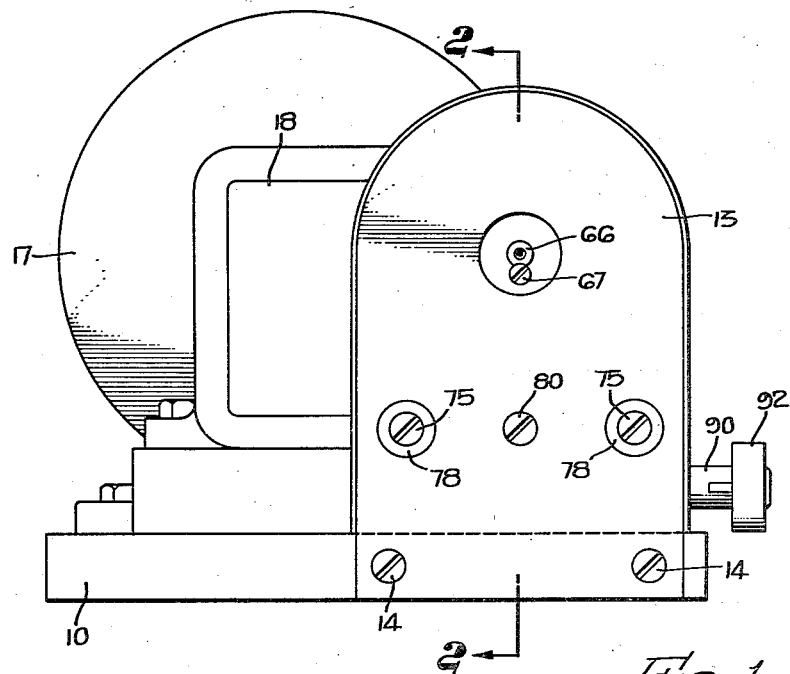
Figure 1 is a front elevational view of the wire stripping apparatus of the present invention.
Figure 3:
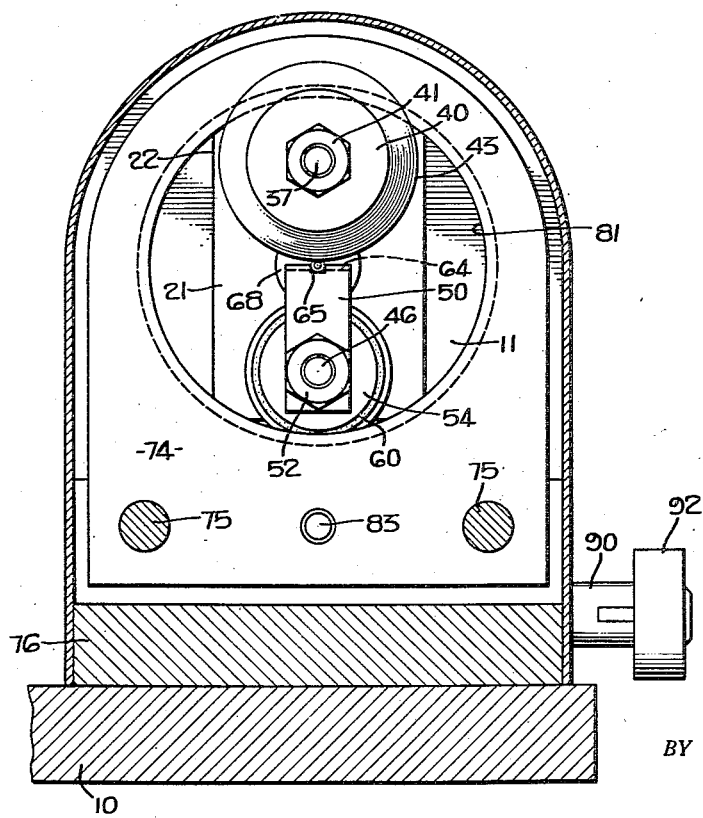
Fig. 3 is a transverse sectional view showing a portion of the cutter actuating mechanism of the present apparatus, as taken substantially as indicated by line 3—3, Fig. 4.
Figure 2:
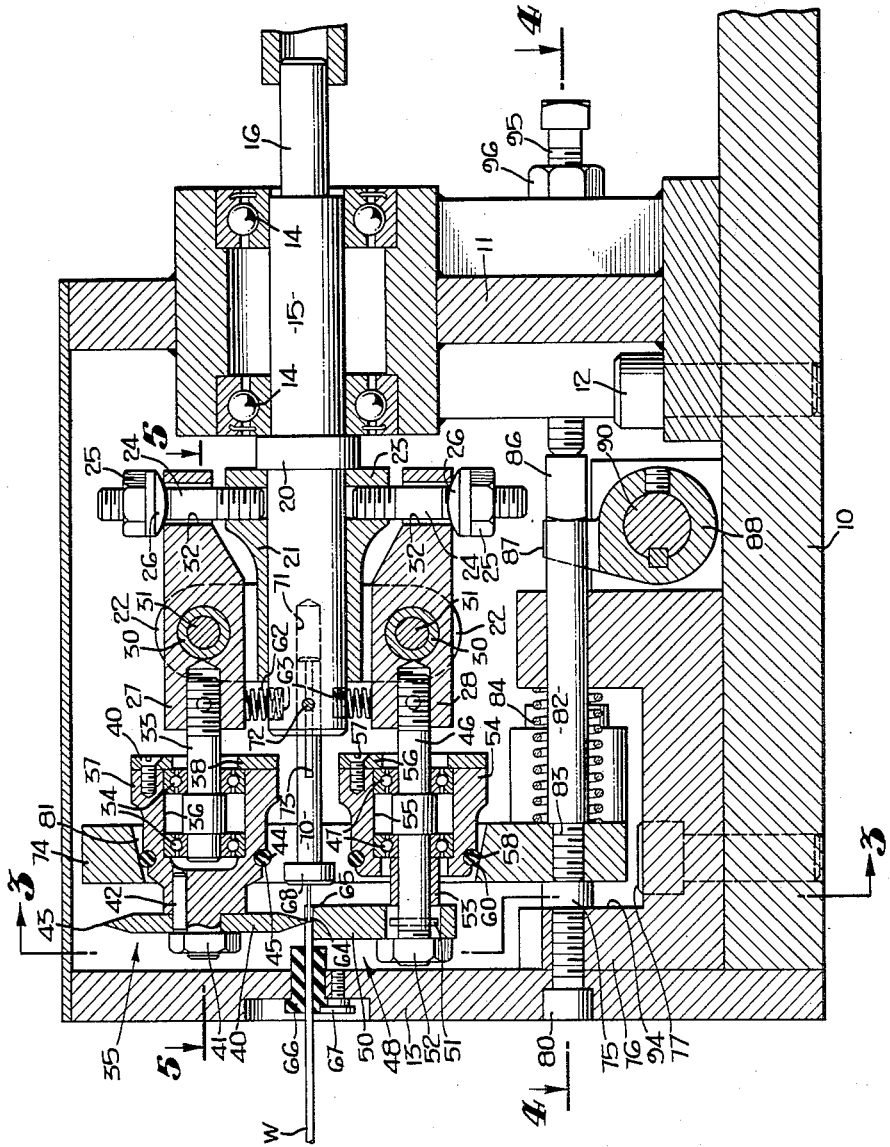
Fig. 2 is an enlarged sectional view through the present apparatus, as taken substantially as indicated by line 2—2, Fig. 1.
Figure 4:
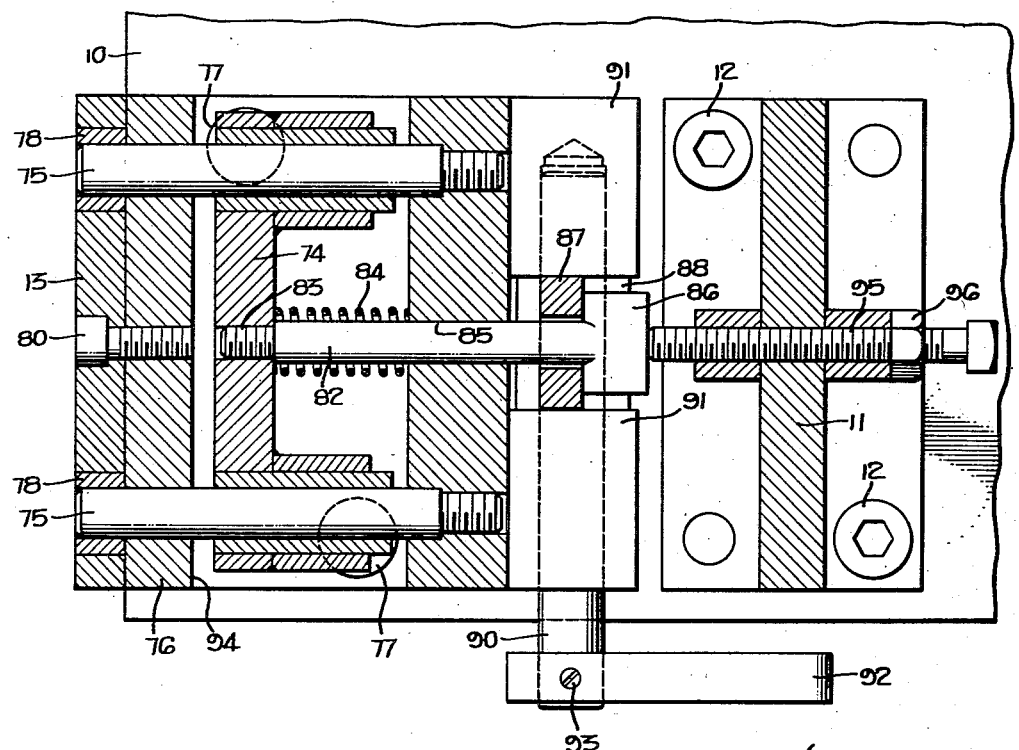
Fig. 4 is a further sectional view showing a portion of the carriage arrangement for the cutter actuating mechanism, as taken substantially as indicated by line 4—4, Fig. 2.

With reference to the drawings, the apparatus of the present invention includes a base plate member 10, one end of which has mounted thereon an end closure and bearing support structure 11 that is secured to the base as by suitable bolts 12. Remote from the support 11, the base 10 has also attached thereto a front plate member 13 that is secured to the base by means of bolts or screws 14. The support 11 is adapted to contain a pair of aligned roller bearings 14 in which a shaft 15 is journalled. The shaft 15 has a stub end 16 that may be connected, in any suitable manner, to a motor 17 through a suitable reducing transmission 18, in order to drive the shaft 15 at a predetermined speed.

The shaft 15 has a flange 20 disposed in the intermediating area thereof, one side of the flange 20 being adapted for engagement with one side of the bearings 14. A sleeve 21 is secured on the end of the shaft 15 remote from the stub portion 16 thereof, with the sleeve 21 being provided with integral laterally extending trunnions 22. The sleeve 21 is further provided with an enlarged portion 23 from which adjustable stop members, in the form of studs 24 are radially disposed. Nuts 25 are threadably secured to the outer ends of the studs 24 with the inner faces of these nuts being contoured for a purpose to be hereinafter more fully described.

A pair of arms 27 and 28, having transverse bearings 30, are journalled on shafts 31 that extend through the trunnions 22. The arms 27 and 28 are also each provided with openings 32 through ends thereof, with these openings being adapted to surround the shanks of the studs 24, the radial outward ends of the openings 32 being also adapted for cooperation with the contoured surfaces 26 of the nuts 25.

The arm 27 has a stub shaft 33 threadably engaged in an end thereof remote from the opening 32 therein. The shaft 33 is adapted to carry a pair of bearings 34 on which is journalled a cutter assembly indicated generally at 35. The cutter assembly 35 includes an axially disposed recess 36 in one end of an annular body 37 thereof, the bearings 34 being adapted for reception in the recess 36 and retention therein by means of an annular retaining plate 38 held in position by means of screws 39 which threadably engage the body 37. The end of the body 37 remote from the plate 38 is fitted with an annular cutter 40 that is secured in position by means of a nut 41 and locked against rotation by means of a pin 42. The pin 42 is retained in position by means of the nut 41. The cutter 40 is provided with a sharp annular cutting edge 43. The body 37 of the cutter assembly 35 is further provided with an annular semicircular groove 44 in which an annular resilient ring 45 is positioned for a purpose to be hereinafter more fully described.

The arm 28 is also provided with a stub shaft 46 that threadably engages the arm in the end thereof remote from the opening 32 therein. The shaft 46 has a pair of bearings 47 mounted thereon, a wire support structure, indicated generally at 48, being mounted on the outer end of the shaft 46. The structure 48 includes an elongated radially extending support arm 50 that is secured to the shaft 46 by means of a pin 51 and a nut 52. A radially outer end of the arm 50 is disposed substantially on the axis of the shaft 15. An annular spacer 53 is disposed between one side of the arm 50 and an inner race of one of the bearings 47, whereby properly to space the arm 50. The bearings 47 serve to support an annular idler body 54 having an axial recess 55 therein, the bearings 47 being received in the recess 55 and retained therein by means of an annular retaining plate 56 secured in position by means of screws 57 or the like. The idler body 54 is also provided with an annular semi-circular groove 58 in which an annular resilient ring 60 is positioned for a purpose to be hereinafter more fully described.

Figure 5:
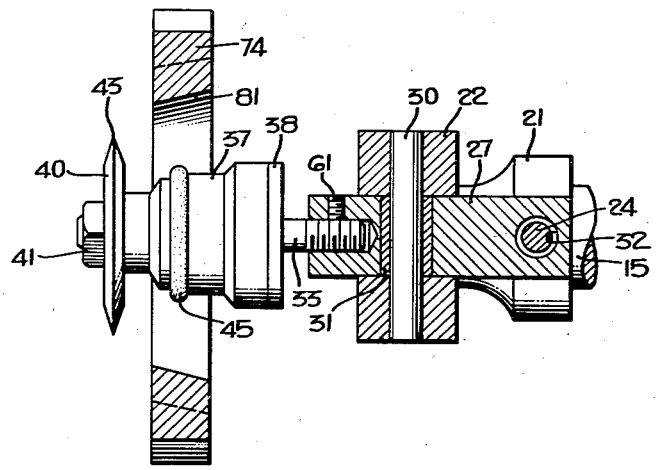
Fig. 5 is a fragmentary sectional view through a portion of the cutter, as taken substantially as indicated line 5—5, Fig. 2.

As shown in Fig. 5, the shaft 33 is secured in arm 27 by means of a set screw 61 that is threadably disposed laterally through the arm for this purpose. Shaft 46 and arm 28 are similarly connected. The arms 27 and 28 are also biased in a direction away from the shaft 15 by means of compression springs 62, the inner ends of which are received in suitable recesses 63 disposed radially in the shaft 15, with the outer ends of the springs 63 being adapted for engagement with radially inwardly directed surfaces of the arms 27 and 28.

The support arm 50 has a transverse groove 64 in the radially outer end thereof, together with longitudinal groove 65 disposed normal to this transverse groove in this outer end. Thus, a wire indicated at W, from which insulation is to be removed, may be inserted through n axial bore in a ferrule 66 mounted in the front cover 13, this ferrule being retained in position by means of a screw 67 engaging one axial end of the ferrule, the wire passing into the longitudinal groove 65 in the arm 50, the inner end of the wire being adapted for engagement with an adjustable stop member 68. The stop member 68 is in the form of an enlarged annular head carried by a shaft 70 that is disposed in an axial bore 71 in one end of the shaft 15 and secured therein by means of a screw 72 which engages the shaft 70 through an elongated slot 73 therein, thus to permit axial adjustment of the position of the stop member 68.

In order to move the support arm 50 of the cutter 40 into the desired positions, an actuating plate 74 is slidably mounted vertically within one end of the apparatus and on a pair of guide rods 75. The guide rods 75 are disposed in parallel spaced relationship longitudinally in the base of the present apparatus and specifically in a U-shaped bracket 76 supported on the base 10 and retained in position by means of screws 77. The rods 75 also extend through suitable sleeve bearings 78 in the face plate member 13. The bracket 76 is also further held in position by means of a screw 80 which engage the cover plate member 13. The actuating plate 74 is provided with an annular enlarged opening 81 having a surface that is generally conical with the conical plane of this surface having an apex lying on the axis of the shaft 15 remote from the end of the shaft containing the stub portion 16. This enlarged opening 81 is adapted to surround both the cutter body portion 37 and idler body portion 45 and is adapted for engagement with the resilient rings 45 and 60 carried on these two bodies respectively.

In order to move the actuating plate 74 in an axial direction, a shaft 82 is threadably secured, as at 83, to the plate in an area intermediate the rods 75. A compression spring 84 is adapted to surround the shaft 82 and is disposed between one side of the actuating plate 74 and one vertically extending portion of the bracket 76, whereby to bias the plate 74 in a direction toward the cover plate member 13. The shaft 82 extends rearwardly, and is slidably disposed in a bore 85 through another vertically extending portion of the bracket 76, with the free end thereof being provided with a pair of laterally extending portions 86 thus forming a T on this end of the shaft 82. The T defined by the portions 86 on the shaft 82 is adapted for engagement with a bifurcated lever 87 that is disposed outwardly from and formed integrally with a sleeve 88 which is, in turn, keyed to a shaft 90. The shaft 90 is journalled in suitable sleeve bearings 91, disposed from a rearward portion of the bracket 76, and extends laterally from one side of the apparatus, the outer end of the shaft 90 having affixed thereto a lever 92 that is secured in position by means of a screw 93.

Under normal conditions, one face of the actuating plate member 74 is disposed in contact with an inner face 94 of the bracket 76 by action of the compression spring 84 and upon movement of the lever 92 and rotation of the shaft 91, the bifurcated lever 87 will move the shaft 82 axially, thus, also to move the actuating plate 74. Rearward movement of the shaft 82 is limited by means of an adjustable stop in the form of an elongated bolt 95 that threadably extends through the bearing support structure 11 and which is locked in position by means of a lock nut 96.

It may thus be seen that upon rotation of the shaft 15, and with the forward surface of the actuating plate 74 in contact with the surface 94 of the bracket 76 the cutter 40 and the support arm 50 will be spaced apart, in a direction radially outwardly from the axis of the shaft 15 by action of the compression spring 62, and will be rotating about the axis of the shaft 15. It is to be noted that the mounting arrangement for the support arm 50 is such as to maintain this arm always in a radial position with respect to the axis of the shaft 15. Upon depression of the lever 92, and movement of the plate 74 in a direction whereby the conical surface of the enlarged annular opening 81 will engage the resilient rings 44 and 45, the arms 27 and 28 will be pivoted about the shafts 31 and against the compression of the spring 62, whereby simultaneously to move the cutter 40 together with the support arm 50 radially inwardly toward each other. The contact of the resilient ring 45 with the conical surface of the opening 81 serves to drive the cutter 40 in a rotary direction opposite from the direction of rotation of shaft 15. Radial inward movement of the arm 50 and cutter 40 is limited by engagement of the contoured portions 26 of the nuts 25 with the outer ends of the openings 32 in the arms 27 and 28, thus in a precision manner to determine the exact placement of the cutter edge 43 with respect to the wire W positioned in the longitudinal groove 65 in the arm 50. The transverse groove 64 in the arm 50 serves to permit entrance of the edge 43 of the cutter 40 to a position whereby to cut the insulation from the wire W. Thus, the nuts 25 together wtih the stop member 95 serve as a dual means for effecting limitation of radial inward movement of the arm 50 and cutter 40 again to provide the desired precision placement of the edge 43 of the cutter with respect to the metallic portion of the insulated wire W. Actually, the adjustment of the cutter 40 is such as to limit further radial movement thereof just prior to contact of the edge 43 with the metallic portions of the wire W.

Having thus described the invention and the present embodiment thereof, it is desired to emphasize the fact that many modifications may be resorted to in a manner limited only by a just interpretation of the following claims.

What is claimed is:

1. An apparatus for stripping insulation from portions of insulated wire comprising, in combination: a base structure; a driving shaft horizontally disposed relative to and rotatable on said base structure; a pair of stub shafts; means for mounting said stub shafts on lateral sides of said driving shafts, said mounting means being pivotally disposed relative to said driving shaft; a cutter mechanism rotatably carried by one of said stub shafts; an annular cutter mounted on said mechanism, said cutter having an annular cutting edge; a wire supporting arm secured to the other of said stub shafts and extending inwardly therefrom toward an axis of said driving shaft; spring means disposed between said driving shaft and said mounting means for biasing said stub shafts, said cutter mechanism and said arm being radially disposed outwardly from said axis of said driving shaft;

an actuating plate disposed for slidable movement on said base and in a direction parallel to said axis of said driving shaft; and annular, conical opening in said actuating plate, a conical surface of said opening being adapted for engagement with said cutter mechanism and said supporting arm; lever means for moving said actuating plate whereby to move said cutter mechanism and said arm radially inwardly against said spring means, said surface also serving to cause rotation of said cutter mechanism in a direction opposite from the direction of rotation of said driving shaft; stop means for limiting said radial inward movement of said cutter mechanism and said arm; wire guide means carried by said base structure and aligned with said axis of said driving shaft; and abutment means carried axially by one end of said driving shaft for limiting movement of said wire through said wire guide means and between said cutter and said arm.

2. An apparatus for stripping insulation from portions of insulated wire comprising, in combination: a base structure; a driving shaft horizontally disposed relative to and rotatable on said base structure; a pair of stub shafts; means for mounting said stub shafts on lateral sides of said driving shafts, said mounting means being pivotally disposed relative to said driving shaft; a cutter mechanism rotatably carried by one of said stub shafts; an annular cutter mounted on said mechanism, said cutter having an annular cutting edge; a wire supporting arm secured to the other of said stub shafts and extending inwardly therefrom toward an axis of said driving shaft; an idler rotatably mounted on said the other of said stub shafts; spring means disposed between said driving shaft and said mounting means for biasing said stub shafts, said cutter mechanism and said arm radially outwardly from said axis of said driving shaft; an actuating plate disposed for slidable movement on said base and in a direction parallel to said axis of said driving shaft; an annular, conical opening in said actuating plate, a conical surface of said opening being adapted for engagement with said cutter mechanism and said idler associated with said supporting arm; lever means for moving said actuating plate whereby to move said cutter mechanism and said arm radially inwardly against said spring means, said surface also serving to cause rotation of said cutter mechanism in a direction opposite from the direction of rotation of said driving shaft; multiple stop means for limiting said radial inward movement of said cutter mechanism and said arm; wire guide means carried by said base structure and aligned with said axis of said driving shaft; and abutment means carried axially by one end of said driving shaft for limiting movement of said wire through said wire guide means and between said cutter and said arm.

3. An apparatus for stripping insulation from portions of insulated wire comprising, in combination: a base structure; a driving shaft horizontally disposed relative to and rotatable on said base structure; a pair of stub shafts; means for mounting said stub shafts on lateral sides of said driving shafts, said mounting means being pivotally disposed relative to said driving shaft; a cutter mechanism rotatably carried by one of said stub shafts; an annular cutter mounted on said mechanism, said cutter having an annular cutting edge; a wire supporting arm secured to the other of said stub shafts and extending inwardly therefrom toward an axis of said driving shaft; spring means disposed between said driving shaft and said mounting means for biasing said stub shafts, said cutter mechanism and said arm radially outwardly from said axis of said driving shaft; a vertically disposed actuating plate disposed for slidable movement on said base and in a direction parallel to said axis of said driving shaft; an annular, conical opening in said actuating plate, a conical surface of said opening being adapted for engagement with and to surround said cutter mechanism and portions of said supporting arm; lever means for moving said actuating plate whereby to move said cutter mechanism and said arm radially inwardly against said spring means, said surface also serving to cause rotation of said cutter mechanism in a direction opposite from the direction of rotation of said driving shaft; stop means for limiting said radial inward movement of said cutter mechanism and said arm; wire guide means carried by said base structure and aligned with said axis of said driving shaft; abutment means carried axially by one end of said driving shaft for limiting movement of said wire through said wire guide means and between said cutter and said arm; and longitudinal groove means in an inner end of said arm, said wire being adapted for disposition and close confinement therein.

4. An apparatus for stripping insulation from portions of insulated wire comprising, in combination: a base structure; a driving shaft horizontally disposed relative to and rotatable on said base structure; a pair of stub shafts; means for mounting said stub shafts on lateral sides of said driving shafts, said mounting means being pivotally disposed relative to said driving shaft; a cutter mechanism rotatably carried by one of said stub shafts; an annular cutter mounted on said mechanism, said cutter having an annular cutting edge; a wire supporting arm secured to the other of said stub shafts and extending inwardly therefrom toward an axis of said driving shaft; an idler rotatably mounted on said the other of said stub shafts; frictional driving rings carried by said cutter mechanism and said idler; spring means disposed between said driving shaft and said mounting means for biasing said stub shafts, said cutter mechanism and said arm radially outwardly from said axis of said driving shaft; an actuating plate disposed for slidable movement on said base and in a direction parallel to said axis of said driving shaft; an annular, conical opening in said actuating plate, a conical surface of said opening being adapted for engagement with said frictional driving rings of said cutter mechanism and said idler associated with said supporting arm; lever means for moving said actuating plate whereby to move said cutter mechanism and said arm radially inwardly against said spring means, said surface also serving to cause rotation of said cutter mechanism, by engagement thereof with said ring carried thereby, in a direction opposite from the direction of rotation of said driving shaft; multiple stop means for limiting said radial inward movement of said cutter mechanism and said arm; wire guide means carried by said base structure and aligned with said axis of said driving shaft; and abutment means carried axially by one end of said driving shaft for limiting movement of said wire through said wire guide means and between said cutter and said arm.

5. An apparatus for stripping insulation from portions of insulated wire comprising, in combination: a base structure; a driving shaft horizontally disposed relative to and rotatable on said base structure; a pair of stub shafts; means for mounting said stub shafts against individual rotation on lateral sides of said driving shafts, said mounting means comprising arm-like blocks and being pivotally disposed relative to said driving shaft; a cutter mechanism rotatably carried by one of said stub shafts; an annular cutter mounted on said mechanism, said cutter having an annular cutting edge; a wire supporting arm secured to the other of said stub shafts and extending inwardly therefrom toward an axis of said driving shaft; an idler rotatably mounted on said the other of said stub shafts; frictional driving rings carried by said cutter mechanism and said idler; spring means disposed between said driving shaft and said mounting means for biasing said stub shafts, said cutter mechanism and said arm radially outwardly from said axis of said driving shaft; an actuating plate disposed for slidable movement on said base and in a direction parallel to said axis of said driving shaft; an annular, conical opening in said actuating plate, a conical surface of said opening being adapted for engagement with said frictional driving rings of said cutter mechanism and said idler associated with said supporting arm; lever means for moving said actuating plate whereby to move said cutter mechanism and said arm radially inwardly against said spring means, said surface also serving to cause rotation of said cutter mechanism, by engagement thereof with said ring carried thereby, in a direction opposite from the direction of rotation of said driving shaft; multiple stop means engageable with said mounting means and said lever means for limiting said radial inward movement of said cutter mechanism and said arm; wire guide means carried by said base structure and aligned with said axis of said driving shaft; adjustable abutment means carried axially by one end of said driving shaft for limiting movement of said wire through said wire guide means and between said cutter and said arm; and a lateral groove in an inner end of said arm, said cutting edge being disposable therein.

6. An apparatus for stripping insulation from portions of insulated wire comprising, in combination: a base structure; a driving shaft horizontally disposed relative to and rotatable on said base structure; a pair of stub shafts; means for mounting said stub shafts against individual rotation on lateral sides of said driving shafts, said mounting means comprising arm-like blocks and being pivotally disposed relative to said driving shaft; a cutter mechanism rotatably carried by one of said stub shafts; an annular cutter mounted on said mechanism, said cutter having an annular cutting edge; a wire supporting arm secured to the other of said stub shafts and extending inwardly therefrom toward an axis of said driving shaft; an idler rotatably mounted on the other of said stub shafts; frictional driving rings carried by said cutter mechanism and said idler; spring means disposed between said driving shaft and said mounting means for biasing said stub shafts, said cutter mechanism and said arm radially outwardly from said axis of said driving shaft; a vertically disposed actuating plate disposed for slidable movement on said base and in a direction parallel to said axis of said driving shaft; an annular, conical opening in said actuating plate, a conical surface of said opening being adapted for engagement with and to surround said frictional driving rings of said cutter mechanism and portions of said idler associated with said supporting arm; lever means for moving said actuating plate whereby to move said cutter mechanism and said arm radially inwardly against said spring means, said surface also serving to cause rotation of said cutter mechanism, by engagement thereof with said ring carried thereby, in a direction opposite from the direction of rotation of said driving shaft; multiple stop means engageable with said mounting means and said lever means for limiting said radial inward movement of said cutter mechanism and said arm; wire guide means carried by said base structure and aligned with said axis of said driving shaft; adjustable abutment means carried axially by one end of said driving shaft for limiting movement of said wire through said wire guide means and between said cutter and said arm; a lateral groove in an inner end of said arm, said cutting edge being disposable therein; and longitudinal groove means in an inner end of said arm, said wire being adapted for disposition and close confinement therein.

References Cited in the file of this patent
UNITED STATES PATENTS

| | | |
|---|---|---|
| 988,616 | Anderson | Apr. 4, 1911 |
| 1,433,320 | Wersel | Oct. 24, 1922 |
| 1,477,678 | Wetmore | Dec. 18, 1923 |
| 2,671,363 | Wells | Mar. 9, 1954 |